United States Patent
Stankovich

[15] 3,701,544
[45] Oct. 31, 1972

[54] MOTORCYCLE FRONT END ASSEMBLY
[72] Inventor: Frank M. Stankovich, 1130 Florence, Evanston, Ill. 60202
[22] Filed: Oct. 13, 1970
[21] Appl. No.: 80,296

[52] U.S. Cl. ................280/276, 248/356, 267/177, 280/283, 287/52.08
[51] Int. Cl..........................B62k 21/02, B62k 25/02
[58] Field of Search ......280/276, 277, 283; 267/177; 287/52.08, 52.07

[56] References Cited

UNITED STATES PATENTS

| | | | |
|---|---|---|---|
| 3,528,700 | 9/1970 | Kamin et al............280/289 X |
| 785,455 | 3/1905 | Vigie ....................248/356 X |
| 989,203 | 4/1911 | Stebbins .............287/52.07 X |
| 1,948,600 | 2/1934 | Templeton.............267/177 X |
| 2,540,525 | 2/1951 | Howarth et al. .......267/177 X |
| 895,409 | 8/1908 | Hallowell...............287/52.08 |
| 2,437,305 | 3/1948 | Nickle ....................287/52.08 |
| 2,474,360 | 6/1949 | Jimerson.............287/52.08 X |

FOREIGN PATENTS OR APPLICATIONS

| | | | |
|---|---|---|---|
| 1,315,209 | 12/1962 | France......................280/276 |
| 284,118 | 1/1928 | Great Britain.............280/276 |
| 840,190 | 4/1952 | Germany....................280/21 |

Primary Examiner—Kenneth H. Betts
Assistant Examiner—John P. Silverstrim
Attorney—Hill, Sherman, Meroni, Gross & Simpson

[57] ABSTRACT

A front end suspension assembly for a motorcycle having a pair of fork tubes telescopically received in a pair of front wheel axle connected support tubes terminating at their open ends in spring collars, and a compression spring entrapped between the support tube collar and an adjustable locking collar received on the fork tubes.

6 Claims, 3 Drawing Figures

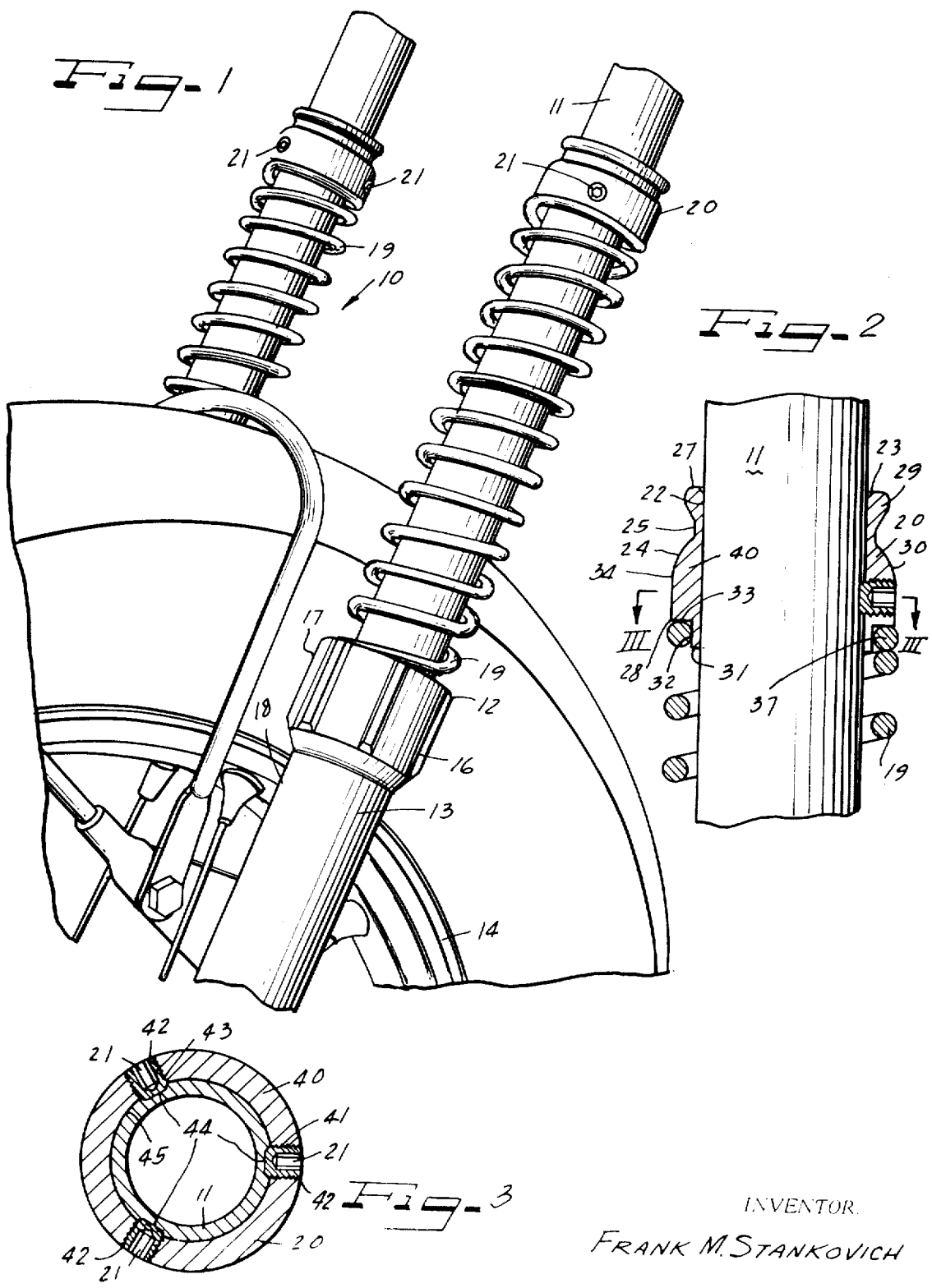

MOTORCYCLE FRONT END ASSEMBLY

BACKGROUND OF THE INVENTION

1. Field of the Invention

This invention relates to motorcycles and more particularly to a front end spring suspension therefor.

2. Prior Art

Motorcycle front wheels are normally attached to the main body through a pair of fork tubes which are telescopically received in support tubes having their opposite ends attached to the axle of the front wheel. A suspension mechanism is incorporated between the telescoping tubes.

Oftentimes, the front support will incorporate external springs enclamped between the support tubes and the fork and positioned around the fork tubes. Thus, when the motorcycle is loaded or when the front wheel encounters shocks, the fork tubes and support tubes will telescope, compressing the springs. A normal method of bottoming the springs adjacent the top of the fork tubes is by use of a secondary abutment tube received around the fork tubes. The upper end of the abutment tube rests against the fork or yoke while the bottom end abuts the top of the springs. Such arrangements are not esthetically desirable and further do not provide for adjustment of the length of the fork tubes. Recently, motorcycle design has emphasized the use of extended fork tubes with the front wheel positioned further away from and ahead of the main body of the motorcycle. Normal design use would therefore require the provision of elongated abutment sleeves between the fork or yoke abutment and the springs. This results in added front end weight as well as increasing the possibilities of misalignment and clatter. Further, it is desirable to have an adjustable attachment for the springs to allow compensation for differing operator preferences. Further, the use of abutting sleeves prevents the manufacturer from providing a standard set of front end components usable with any length of fork tube.

SUMMARY OF THE INVENTION

The invention overcomes the prior art disadvantages and provides an esthetically pleasing adjustable front end spring support.

The support consists of a pair of elongated fork tubes of any desired length which extend downwardly from the motorcycle front end fork assembly, and which are telescopically received in support tubes through an open end thereof. The other end of the support tubes is attached to the axle of the front wheel. A collar is provided around the open ends of the support tubes, which collar may include a seal. A coil spring is received around the fork tube having one end bottomed against the collar of the support tube. An adjustable collar having releasable securing means such as set screws therein is also received around the fork tube and abuts the top of the compression spring. The set screws allow positioning of the adjustable collar at any point along the length of the fork tubes. Thus, the compression spring is entrapped between the adjustable collar and the support tube collar and controls telescoping of the fork tubes into the support tubes.

It is therefore a primary object of this invention to provide an improved motorcycle front end support.

It is a further and more specific object of this invention to provide an adjustable support for the front end of a motorcycle.

It is a specific object of this invention to provide a front end motorcycle support wherein fork tubes are telescopically received in support tubes with coil springs received around the fork tubes having one end thereof abutting the support tubes and the other end thereof abutting abutment collars received around the said fork tubes, the abutment collars being positionable at any determined point along the length of the fork tubes.

BRIEF DESCRIPTION OF THE DRAWINGS

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

FIG. 1 is a fragmentary plan view of a motorcycle front end suspension assembly equipped with the devices of this invention.

FIG. 2 is a fragmentary cross-sectional view of one of the adjustable collars received around the fork tube.

FIG. 3 is a cross-sectional view taken along the lines III—III of FIG. 2.

DESCRIPTION OF THE PREFERRED EMBODIMENT

FIG. 1 illustrates a motorcycle front end assembly 10 which comprises a pair of fork tubes 11 which extend downwardly from a motorcycle front end fork assembly (not illustrated). The fork tubes may be of any length, and recent design has emphasized the use of elongated fork tubes.

The fork tubes are telescopically received in open ends 12 of support tubes 13. The opposite end of the support tubes 13 is affixed to the axle (not illustrated) of the front wheel 14 of the motorcycle.

The support tube 13 is substantially cylindrical and hollow on the interior with an abutment collar 16 integrally attached thereto around the open end 12.

The abutment collar 16 has an outer diameter 17 greater than the outer diameter 18 of the support tube and has an inner ledge (not illustrated) which forms an abutment for a coil spring 19 at one end thereof. The abutment collar 16 may also include a seal. The coil spring 19 is received around the fork tube 11 and extends upwardly from the abutment collar 16 longitudinally of the fork tube 11.

The coil spring 19 is used to control telescoping of the fork tube 11 into the support tube 13 and is therefore attached to either the fork tube or the fork assembly.

Prior art design has emphasized attachment of the coil spring to the fork assembly normally by provision of a secondary sleeve received around the fork tube which sleeve has one end bottoming against the fork assembly and the other end bottoming against the top of the coil spring. It can therefore be seen that when the motorcycle is loaded or when the front wheel undergoes shocks or other jars, the fork tubes 11 will telescope into the support tubes 13 thereby compressing the coil spring 19 which will urge them apart. Provision is normally made on the end of the fork tubes in cooperation with the support tubes to maintain them therein to prevent disassembly of the unit.

The use of secondary sleeves or other prior art devices to abut the ends of the coil springs remote from the support tubes, has required different units for different motorcycles and different length fork tubes. This also has restricted the adjustability of the front end support when such adjustability may be desired for different terrain conditions or rider preference.

Recently, design preference has emphasized the placement of the front wheel of a motorcycle further out from the main body of the motorcycle. This is normally accomplished by providing longer fork tubes. In old designs, the provision of longer fork tubes would also require either the provision of longer coil springs or the provision of longer pre-set abutment members for abutting the top end of the coil springs.

The present invention eliminates this problem by providing an adjustable abutment collar 20 for abutting the top end of the coil spring 19. The abutment collar 20 is received around the fork tube 11 and is slidable therealong to any desired position. The collar 20 includes releasable securing means comprising a plurality of spaced-apart radial set screws 21 which are adjustable into fastening engagement with the outer diameter of the fork tubes 11. Therefore, the collar 20 can be assembled on the fork tube 11 at any pre-determined point in abutment with the top end of the coil springs and thereafter tightened into position irrespective of the length of the individual fork tubes or the coil springs. Thus, the collars of this invention are utilizable on substantially all motorcycles irrespective of the positioning and length of the fork tubes and coil springs.

As best illustrated in FIG. 2, the collars 20 have a substantially cylindrical inner diameter 22 with a chamfer 23 at the top end thereof for ease of placement on the fork tube. The outer diameter 24 of the collars has a cylindrical portion 25 intermediate the ends 27 and 28 thereof closer to the top end 27. An increased diameter bulge portion 29 extends from the upper end 27 to the cylindrical portion 25 and a second longer and radially greater bulge portion or thick wall portion 30 extends from the cylindrical portion 25 to a stepped bottom 28. The bottom 28 has a first diameter cylindrical portion 31 having an axially extending wall 32 which extends towards the top end 27 a slight distance and which terminates in a radial wall or transversely extending abutment face 33 which extends outwardly to the outer diameter 34 of the increased bulge area 30. The axial wall 32 and radial wall 33 provide a stepped ledge at the bottom 28 of the collar. The stepped ledge 28 forms a seating member for the top 37 of the coil spring 19. The top 37 of the coil spring will abut against the radial wall 33 while the axial wall 32 forms means for radially spacing the end of the spring from the surface of the tube by holding the spring 19 radially outwardly from the fork tube 11 to prevent scratching or marring of the fork tube when it telescopes into the support tube 13 thereby compressing the spring. The movable abutment points enable an infinite variations of the axial length of the fork tube telescopically received in the support tube and thus an infinite selection of the length of the extension of the front end suspension.

The provision of the upper bulge 29 eliminates any sharp edges at the top of the unit thereby providing a safety feature. The lower bulge 30, which extends radially outwardly beyond the upper bulge to provide a thickened body portion 40 provides sufficient material for internal threads 41 in bores 42 for the set screws. The use of the bulges as opposed to a substantially thicker collar reduces the weight of the collar while providing an esthetic appearance.

The set screws 21 are preferably three in number and are spaced circumferentially around the collar 20 at equidistant points. The set screws 21 have external threads 43 to mate with the internal threads 41 in the openings 42 and are preferably of the type which require an Allen wrench to operate. Tightening of the set screws 21 into the collar 20 will force their radially inner ends 44 to dimple the outer diameter 45 of the fork tubes 11 to lock the collar thereto. It can be seen that although a satisfactory lock is provided by the three set screws, no substantial damage is done to the fork tubes other than the minor dimpling thereof and release of the set screws will allow the collar to be positioned at other points along the length of the fork tubes.

It can therefore be seen from the above that my invention provides a novel front end suspension for motorcycles wherein an external coil spring is entrapped between a stationary abutment point and a movable abutment point on the fork tubes.

Although the teachings of my invention have herein been discussed with reference to specific theories and embodiments, it is to be understood that these are by way of illustration only and that others may wish to utilize my invention in different designs or applications.

I claim as my invention:

1. In a motorcycle front end support having a pair of substantially hollow tubes attached to an axle of the front wheel of the motorcycle with fork tubes having a smooth continuous outer surface telescopically received therein and a coil spring received around each of the fork tubes having one end abutting against the support tube, the improvement of an adjustable collar having a continuous cylindrical inner surface portion telescopically received on each of the fork tubes for sliding movement thereon, each of said collars having a thick wall portion providing a substantially transversely extending abutment face on one end thereof for abutting the other end of said spring, said thick wall portion terminating at its other end with a decreasing outer diameter, and said collar having means extending radially through the thick wall portion to engage the outer surface of the fork tube for releasably securing the collar at an infinite number of positions on the fork tube to entrap the coil spring between the collar and the open end of the support tube as the fork tube is telescopically received therein, said means for releasably securing the collar on the fork tube enabling an infinite adjustment in the length of each fork tube received in its respective support tube to enable an infinite selection for the length of the extension of the front end support of the motorcycle.

2. In a motorcycle front end support according to claim 1, wherein said means for releasable securing comprises a plurality of circumferentially spaced set screws extending radially through said thick wall portion.

3. In a motorcycle front end support according to claim 1, wherein said abutment face of the collar includes means for radially spacing the other end of the coiled spring from said fork tube to prevent scratching and marring of the tube during movement thereof in the support tube.

4. In a motorcycle front end support according to claim 3, wherein said one end of the collar has a stepped bottom end with a radially wall forming the abutment face and an axially extending wall forming the means for radially spacing.

5. In a motorcycle front end support according to claim 4, wherein the collar has a substantial cylindrical portion of a smaller thickness adjacent said thick wall portion, said cylindrical portion terminating in an increased radius bulge portion extending from a chamfered opening at the other end of the collar, and said means for securing comprising a plurality of circumferentially spaced set screws.

6. A motorcycle front end support comprising a pair of fork tubes having a substantial smooth outer surface attached to a motorcycle front end fork assembly, a pair of substantially hollow support tubes attached to an axle of the motorcycle front wheel, each of said pair of support tubes having an open end with an abutment member for telescopically receiving the fork tubes, an adjustable collar having a continuous cylindrical inner surface portion telescopically received on each of said fork tubes for sliding movement thereon and having a thick wall portion adjacent a lower end providing a lower abutment surface, each of said collars having means extending radially through the thick wall portion to engage the outer surface of the fork tube for adjustably fastening said collars to said fork tubes to enable attachment of the collars at any point along the axial length of the fork tubes, a coil spring telescopically received on each of said fork tubes and entrapped between the lower abutment surface and the abutment member of the open end to determine the length of the fork tube telescopically received in the support tube, wherein the adjustable fastening means on the collar allows adjustment of the axial position of the colar to infinitely vary the length of each fork tube received in its respective support tube to enable an infinite variation in the length of the motorcycle front end support.

* * * * *